United States Patent [19]

Heidenreich et al.

[11] Patent Number: 5,582,277
[45] Date of Patent: Dec. 10, 1996

[54] CALIPER DISK BRAKE FOR STEEL MILL CRANES

[75] Inventors: David C. Heidenreich, Akron; Thomas L. Richards, Hartville, both of Ohio

[73] Assignee: Power Transmission Technology, Inc., Sharon Center, Ohio

[21] Appl. No.: 392,256

[22] Filed: Feb. 22, 1995

[51] Int. Cl.$^6$ ................................................ B60T 13/04
[52] U.S. Cl. .................. 188/171; 188/72.3; 188/72.9; 188/73.1; 188/250 B; 188/250 G; 188/73.32
[58] Field of Search ............................ 188/171, 173, 188/58–59, 73.1, 73.32–73.34, 72.9, 250 B, 250 G, 251 R, 251 M, 251 A, 72.3, 43–45, 161, 158, 72.1; 310/76, 77

[56] References Cited

U.S. PATENT DOCUMENTS

| | | | |
|---|---|---|---|
| 2,827,986 | 3/1958 | Casey, III et al. | 188/72.9 |
| 2,925,153 | 2/1960 | Hodgson | 188/171 |
| 3,037,860 | 6/1962 | Masterson et al. | 188/251 M |
| 3,520,386 | 7/1970 | Rogier | 188/171 |
| 4,067,420 | 1/1978 | Fabris | 188/171 |
| 4,592,451 | 6/1986 | Persson | 188/72.9 |
| 4,611,692 | 9/1986 | Everett | 188/73.1 |
| 5,038,896 | 8/1991 | Wirth | 188/59 |
| 5,101,939 | 4/1992 | Sheridan | 188/171 |
| 5,199,532 | 4/1993 | Suganuma et al. | 188/171 |
| 5,253,738 | 10/1993 | Vertesy et al. | 188/171 |

FOREIGN PATENT DOCUMENTS

| | | | |
|---|---|---|---|
| 1443294 | 5/1965 | France | 188/171 |
| 2405175 | 6/1979 | France | 188/73.1 |
| 2455218 | 12/1980 | France | 188/171 |
| 2143152 | 3/1973 | Germany | 188/72.9 |
| 2343918 | 3/1975 | Germany | 188/171 |
| 2646736 | 4/1977 | Germany | 188/171 |
| 1442495 | 7/1976 | United Kingdom | 188/73.1 |
| 2027825 | 2/1980 | United Kingdom | 188/72.9 |

*Primary Examiner*—Douglas C. Butler
*Attorney, Agent, or Firm*—Renner, Kenner, Greive, Bobak, Taylor & Weber

[57] ABSTRACT

A caliper disk brake for steel mill cranes includes a pair of armatures having an electromagnetic coil and a spring interposed between them to operate in a clamshell fashion. The spring urges the armatures apart, while actuation of the coil urges the armatures together. Each of a pair of caliper arms is pivotally connected to a respective one of the armatures at one end thereof, and has a pressure plate pivotally maintained at an opposite end. The pressure plates are maintained in juxtaposition to wear pads which are axially movable in apertures maintained in a pair of stationary plates. A disk, adapted for interconnection with the shaft of a steel mill crane hoist motor is positioned between the plates and wear pads. Actuation of the electromagnetic coil closes the armature and disengages the wear plates from the disk, while deactivation of the coil allows the spring to urge the armatures apart, causing the caliper arms to pivot such that the pressure plates engage the wear pads and force them into braking frictional engagement with the disk. The pressure plates and wear pads are free floating and self aligning.

22 Claims, 5 Drawing Sheets

CALIPER DISK BRAKE FOR STEEL MILL CRANES

TECHNICAL FIELD

The invention herein resides in the art of power transmission devices such as clutches and brakes. More particularly, the invention relates to a brake for employment with steel mill cranes. Specifically, the invention relates to a caliper disk brake for steel mill cranes which is readily adapted for replacing drum brakes previously employed for the same purpose.

BACKGROUND ART

In the United States steel industry, direct current (DC) motors having drum-shoe brakes are predominantly used for crane hoist drives. Such drum-shoe brakes pose a significant maintenance problem for the steel mills due to the necessity of frequent adjustments, the existence of thermal limitations, and the extreme difficulties encountered during servicing. Until presently, caliper disk brakes have not been employed in these applications for a number of reasons, among which is the American Iron and Steel Engineers (AISE) specification that the brake coil must be wired in series and must accommodate all of the electric current to the motor of the crane hoist drive. As a consequence, extremely large coils and armatures for releasing the brake are necessitated—significantly increasing the difficulty of adapting a caliper type of brake design. Additionally, the DC motor shaft has a significant amount of axial movement, on the order of $3/16$ inch, which the brake must accommodate. Such axial movement poses a significant problem for caliper disk brakes of the necessary size, particularly with respect to drag and wear.

Additionally, drum-shoe brakes are given to high wear rates, requiring frequent servicing and shoe replacement. Typically, these brakes are in areas which are difficult to access, being associated with cranes in elevated locations. The brake shoes are both heavy and cumbersome. Indeed, in the prior art the process of shoe replacement was not only frequently undertaken, but was a lengthy one.

The position and area allotted for crane drive brakes is rather fixed, requiring that the brake fit into a defined and somewhat limited envelope. Accordingly, any improvement or modification to the brake system must necessarily be confined to that same envelope.

As shown in FIG. 1, a prior art electromagnetic drum brake is designated generally by the numeral 10. The drum brake 10 includes a base 12 maintaining at one end thereof, a pair of armatures 16, 18 having an electromagnetic coil 14 interposed therebetween, the armatures 16, 18 and the electromagnetic coil 14 defining a magnet assembly. A torque spring 20 is also interposed between the inner armature 16 and the outer armature 18, the spring 20 urging the two armatures apart. As is well known and understood by those skilled in the art, the armatures 16, 18 are pivotally or flexibly maintained at the bottoms thereof at the base 12 by angle 15 plates to operate in a clam shell fashion. However, such angle plates were given to fatigue and routinely failed.

An inner shoe lever 22 and outer shoe lever 24 respectively receive inner and outer shoe linings 26, 28. The inner shoe lever 22 is connected to the inner armature 16 by means of an appropriate connector 30, while a pull rod 32 interconnects the outer shoe lever 24 and the outer armature 18, as shown. The shoe linings 26, 28 are maintained in diametric opposition with respect to the drum 34. The drum 34 is rotatable by means of a hub 36 having an aperture and key way 38 adapted for securely receiving the shaft of a crane hoist drive.

In operation of the prior art, with the electromagnetic coil 14 energized, the armatures 16, 18 are drawn together, pulling the brake shoes 26, 28 away from the rotating drum 34, allowing the crane hoist drive to operate freely. However, when the coil 14 is de-energized, the torque spring 20 forces the armatures 16, 18 apart, urging the brake shoes 26, 28 into frictional contacting engagement with the drum 34 to inhibit rotation of the drum 34 and the attached shaft.

In the prior art brake 10, the shoes 26, 28 are heavy, cumbersome, and given to rapid wear. Additionally, the structure of the brake assembly 10 is such that removal and replacement of the brake shoes 26, 28 require substantial dismantling and disassembly of the brake assembly 10. Accordingly, it is desirable to devise a disk brake assembly in substantially the same general envelope as that employed by the brake 10, and employing the same armature and coil assembly and various other structural features of the prior art.

The drum-shoe brakes of the prior art are generally characterized by a limited thermal capacity, restricting the operability of the brakes, since every brake operates on the basis of converting mechanical energy to thermal energy. Accordingly, it is desirable to devise a disk brake assembly having increased disk diameter over the drum-shoe brakes of the prior art, thus accommodating higher duty cycles of operation than with the prior art. The increased productivity demands of the steel industry can only be met by the provision of a brake that accommodates such high duty cycles and which can be placed in the same space as the prior art brakes.

DISCLOSURE OF INVENTION

In light of the foregoing, it is a first aspect of the invention to provide a caliper disk brake for steel mill cranes which may readily replace prior art drum-shoe brakes by utilizing the same armature, coil, torque spring, and similar structures.

Another aspect of the invention is to provide a caliper disk brake for steel mill cranes which provides for ease of friction wear part replacement.

A further aspect of the invention is to provide a caliper disk brake for steel mill cranes which reduces the weight and bulk of the replacement wear parts.

Still a further aspect of the invention is to provide a caliper disk brake for steel mill cranes which maximizes the disk size while staying within the prior art envelope for the brake.

Still another aspect of the invention is to provide a caliper disk brake for steel mill cranes in which the armatures act directly on caliper arms without intermediate linkage.

An additional aspect of the invention is to provide a caliper disk brake for steel mill cranes which provides for ease of brake adjustment.

Yet a further aspect of the invention is to provide a caliper disk brake for steel mill cranes which has minimal friction pad drag.

Still a further aspect of the invention is to provide a caliper disk brake for steel mill cranes which employs self aligning pressure plates with respect to the friction pads.

Another aspect of the invention is to provide a caliper disk brake for steel mill cranes which accommodates manual adjustment of the holding torque.

A further aspect of the invention is to provide a caliper disk brake for steel mill cranes in which there is no torque reaction into the caliper arms, thereby minimizing weight and drag.

A further aspect of the invention is to provide a caliper disk brake for steel mill cranes which employs uniquely shaped wear pads to accommodate disk misalignment and pad misalignment as it wears.

Yet another aspect of the invention is to provide a caliper disk brake for steel mill cranes in which the wear pads are formed in two halves to provide for economy and ease of replacement.

A further aspect of the invention is to provide a caliper disk brake for steel mill cranes in which a self adjuster automatically adjusts for wear.

Another aspect of the invention is to provide a caliper disk brake for steel mill cranes in which free moving caliper arms adjust for axial movement of the shaft and disk.

Still a further aspect of the invention is to provide a caliper disk brake for steel mill cranes which employs sealed and lubricated caliper arm bushings for free movement of the arms and for low maintenance.

Yet an additional aspect of the invention is to provide a caliper disk brake for steel mill cranes in which armature hinge plates are move flexible than in the prior art, significantly reducing fatigue and failure.

The foregoing and other aspect of the invention which will become apparent as the detailed description proceeds are achieved by a caliper disk brake, comprising: a pair of armatures having an electromagnetic coil and a spring interposed therebetween, said spring urging said armatures apart, and actuation of said coil urging said armatures together; a pair of caliper arms, one pivotally connected at a first end thereof to each of said armatures; a pressure plate pivotally maintained at a second end of each of said caliper arms; a disk adapted for connection to a rotatable shaft; means for maintaining at least one brake pad on each side of said disk in axially moveable relation to said shaft, said brake pads being positioned between said pressure plates; and a cross link member pivotally interconnecting said caliper arms between said first and second ends.

Other aspects of the invention which will become apparent herein are achieved by a friction wear pad for a caliper disk brake for steel mill cranes, comprising: an elongated body portion having a pair of orthogonal axes; radiused end portions extending from said body portion at diametrically opposed ends of one of said orthogonal axes; and wherein said wear pad is symmetrical about each of said pair of orthogonal axes.

DESCRIPTION OF DRAWINGS

For a complete understanding of the objects, techniques and structure of the invention reference should be made to the following detailed description and accompanying drawings wherein.

BEST MODE FOR CARRYING OUT THE INVENTION

Figure 2:
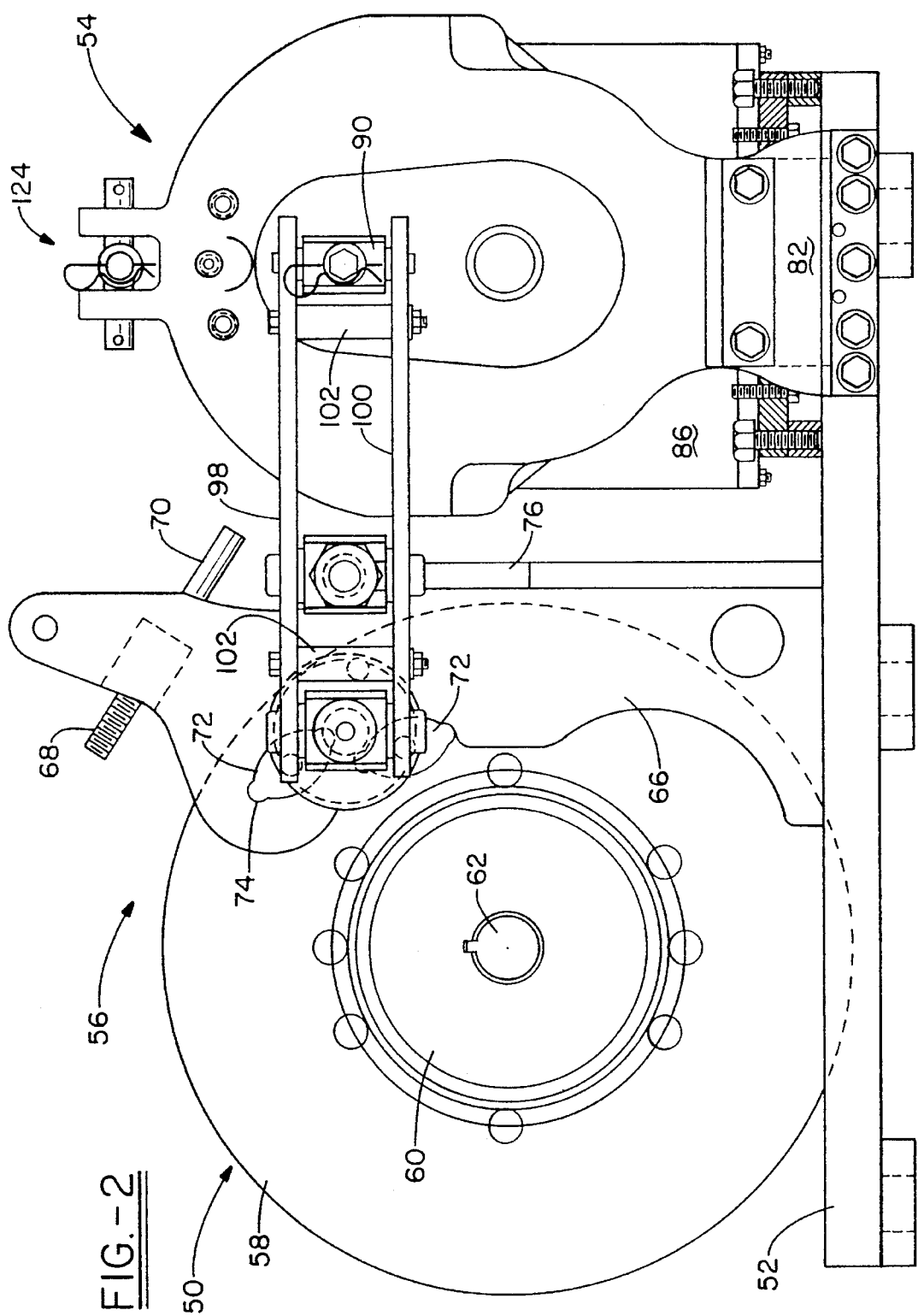
FIG. 2 is a side elevational view of the caliper disk brake for steel mill cranes according to the invention.
Figure 3:
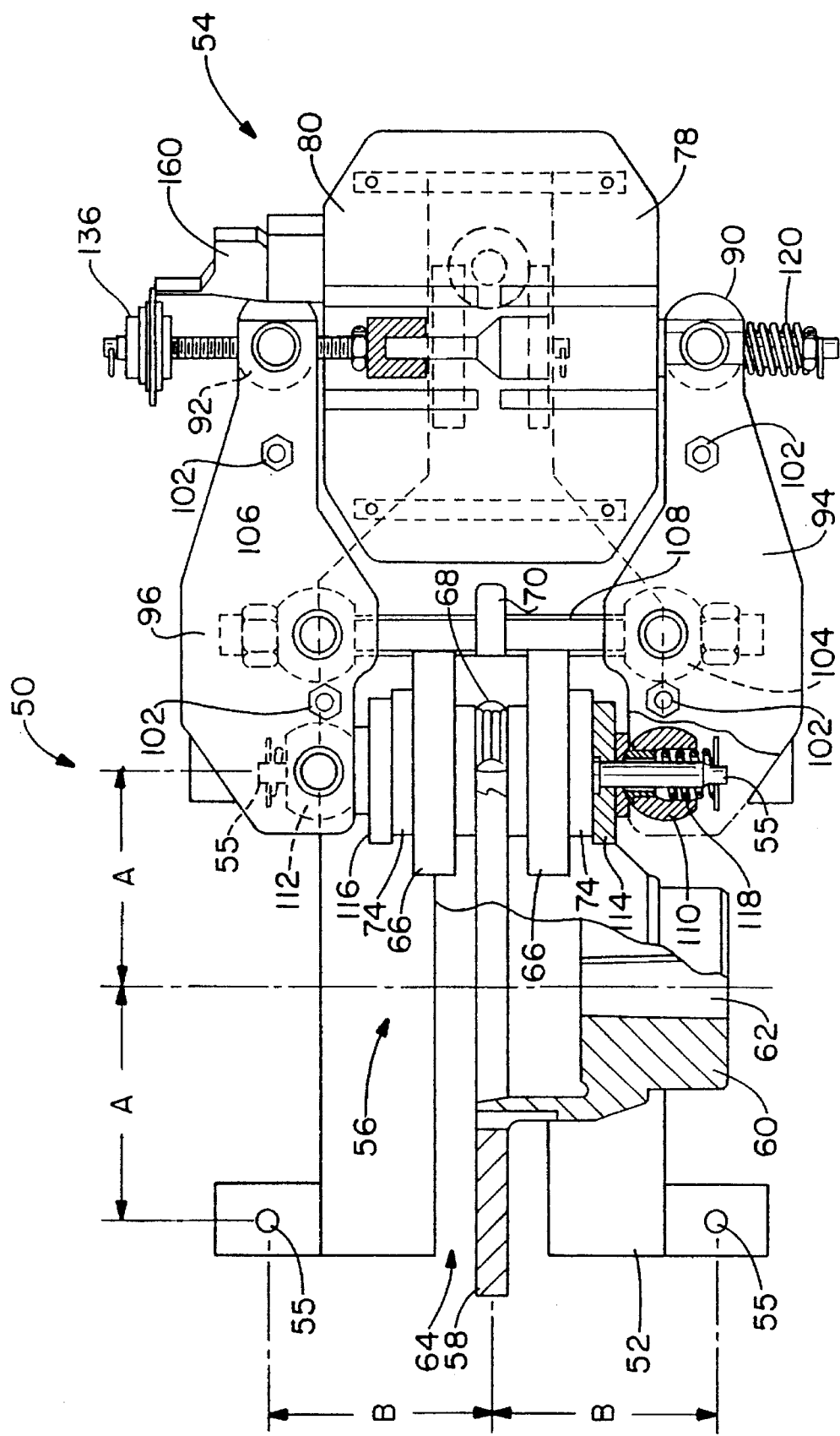
FIG. 3 is a top plan view of the caliper disk brake of FIG. 2.

Referring again to the drawings, and particularly FIGS. 2 and 3, it can be seen that a caliper disk brake for steel mill cranes made in accordance with the invention is designated generally by the numeral 50. The brake assembly 50 includes a base 52 of substantially the same size and employing the same mounting hole pattern as the prior art base 12. Affixed to one end of the base 52 is an armature and coil assembly 54, with the brake disk assembly 56 being maintained at the opposite end thereof. The disk 58 maintains substantially the same rotational axis as the drum 34 of the brake 10. However, the armature and coil assembly 54 is rotated 90° from its positioning in the prior art structure 10, as is clearly apparent from the drawings. Indeed, the caliper disk brake 50 has the operational axes of the brake disk 58 and armature and coil assembly 54 orthogonal to each other, whereas the prior art has such axes in a parallel orientation.

The brake disk 58 of the brake disk assembly 56 includes a hub 60 mounted thereto and having a keyed tapered bore 62 axially therein for receiving and engaging the crane hoist drive shaft.

As is apparent from FIGS. 2 and 3, the base 52 is characterized by a central slot 64 extending from one end thereof and adapted for receiving the brake disk 58. Not only does the slot 64 allow the brake assembly 50 to accommodate a larger disk than would be possible without the slot, but it also facilitates placement of the brake 50 with respect to the disk. Specifically, the base 52 may simply be slid around the disk 58, rather than under it as in the prior art. Additionally, the base 52 is provided with the same AISE hole pattern 55 as employed by the prior art drum shoe brakes 10, allowing the caliper disk brake 50 to readily replace the prior art 10 in virtually all installations. With reference to FIG. 3, the hole pattern 55 is identified with regards to its symmetry respecting the axis of the disk 58 (the "A" dimension) and the central plane of the disk 58 (the "B" dimension). It will be appreciated that the axis of the disk 58 is also the central axis of the crane hoist motor and connecting shaft, the latter of which is received by the bore 62. As stated herein the AISE hole pattern 55 incorporates the following dimensional relations:

| A | B |
|---|---|
| 3.25 inches | 2.875 inches |
| 4.0 inches | 3.125 inches |
| 5.75 inches | 4.5 inches |
| 7.5 inches | 5.375 inches |
| 9.25 inches | 6.5 inches |
| 11.75 inches | 8.0 inches |
| 15 inches | 9.5 inches |

A pair of side plates 66 are fixed to the base 52 and extend upwardly therefrom to define a support tower. A slide pin assembly 68 extends between the side plates 66 as shown. In normal operation, the pin 70 extends from the assembly 66, as shown in FIG. 2. When desired, the pin may be retracted upwardly into a position substantially between the plates 66 as may be desired during servicing as discussed below. When the pin 70 is released, gravity urges it to return to the position shown in FIG. 2.

Each of the side plates 66 also receives a plurality of friction pads 72. The pads 72 are received within substantially congruent openings 74 provided within the plates 66. While any of various numbers of such friction pads 72 might be employed, in a preferred embodiment of the invention it is anticipated that each of the plates 66 will receive three such pads 72, the pads of each of the plates 66 being diametrically opposed from the corresponding pad of the opposite plate, with the disk 58 interposed therebetween. Additionally, while each of the friction pads 72 may be of various geometric configurations, it is preferred that they be generally elliptical with a scalloped or radiused end, as presented below with respect to FIG. 5. Of course, the opening 74 provides for axial movement of the friction pads 72 during braking operations, in a manner to be discussed below and as is also understood by those skilled in the art. Finally, the side plates 66 are also interconnected at a back portion thereof by means of a support bar 76 which is adapted to support the caliper arms as will be presented further below.

Figure 1:
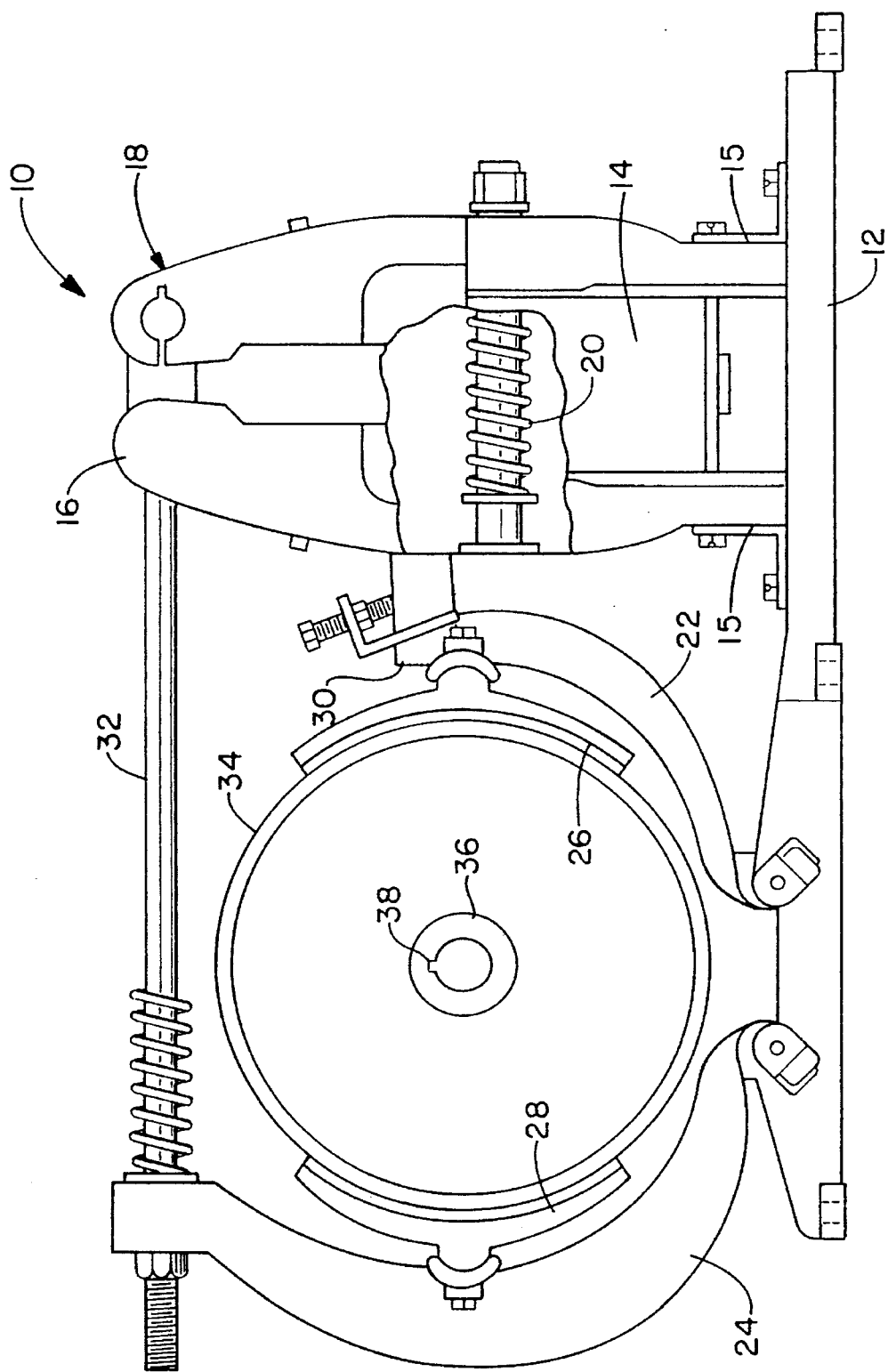
FIG. 1 is a side elevational view in partial cross section illustrating a prior art electromagnetic drum brake.
Figure 4:
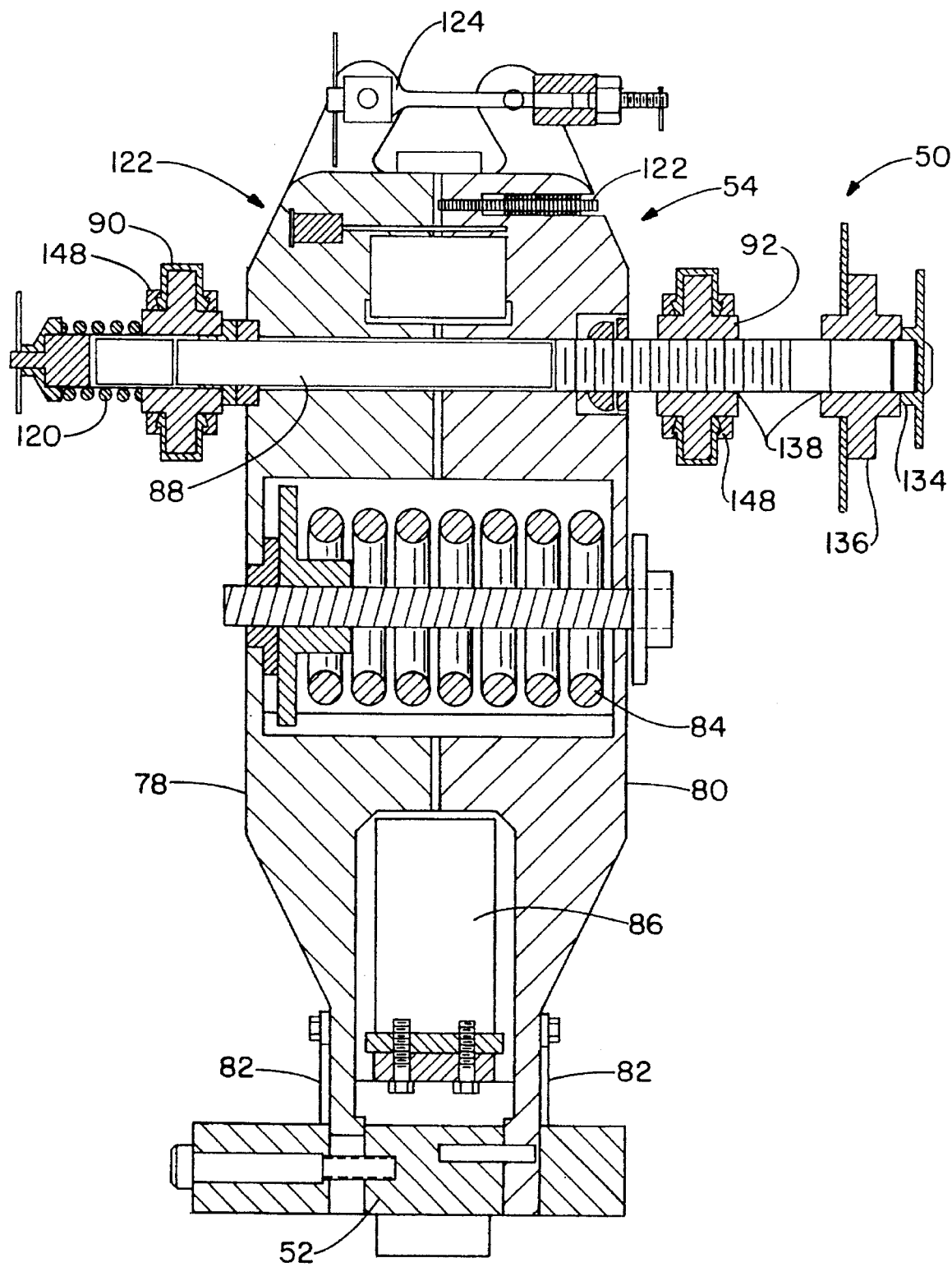
FIG. 4 is a cross sectional view of the coil and armature assembly of the caliper disk brake of FIGS. 2 and 3.

With reference now to the armature and coil assembly 54 of FIG. 4, it can be seen that the same comprises a pair of armatures 78, 80 which are quite similar to the armatures 16, 18 of the prior art structure 10. The armatures 78, 80 operate in a clam shell fashion, being secured at the bottoms thereof to the base 52 by spring or flex plates 82. Each of the flex plates 82 may comprise a single plate or a stack of leaf plates, as required. A torque spring 84, similar to the spring 20 of FIG. 1, is interposed between the armatures 78, 80 to urge them apart and thus open the clam shell configuration. Also interposed between the armature 78, 80 is an electromagnetic coil 86 which, when energized, pulls the armatures 78, 80 toward each other, seeking to close the clam shell. It will be appreciated that the current passing through the coil 86 is that current which operates the motor of the crane hoist drive.

An armature linkage 88 consists of a threaded rod passing between the armatures and slidingly receiving thereon a trunion adjacent the armature 78 and a trunion 92 adjacent the armature 80. The trunions 90, 92 respectively receive ends of caliper arms 94, 96, each such caliper arm comprising a pair of plates 98, 100 secured together by means of bolts and spacers 102, as shown.

Trunions 104, 106 are interposed between the caliper arm plates 98, 100 at opposite ends of the cross link member 108. The cross link member 108 is, in the normal operating position, received upon and supported by the support bar 76 extending between the pair of side plates 66. Finally, trunions 110, 112 are provided at ends of the caliper arms 94, 96 to respectively receive and secure pressure plates 114, 116 thereat. Each of the trunions 110, 112 includes a self-aligning bushing assembly 118 to assure alignment of the pressure plates 114, 116 with their respective compliment of three pressure pads 72. In other words, the self aligning bushing assemblies 118 assure flush contacting engagement of the pressure plates 114, 116 with the associated wear pads 72 to optimize braking efficiency.

Figure 9:
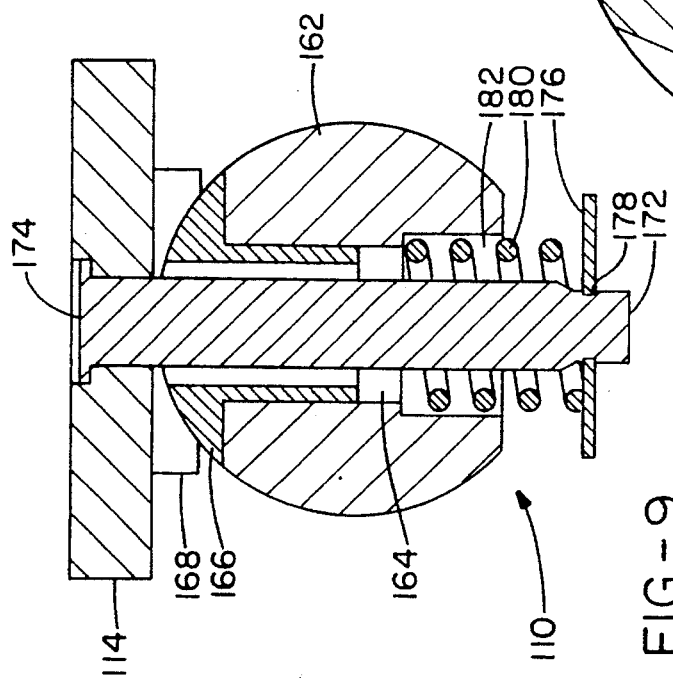
FIG. 9 is a cross sectional view of a trunion employed in the caliper disk brake of the invention.

With attention now to FIG. 9, an appreciation of the details of a representative trunion 110 may be attained. As shown, the trunion 110 has a generally spherically shaped body portion 162 having a central bore 164 axially therethrough. A bushing 166 is received in one end of the bore 164 and has a semi-spherical end portion which establishes a continuation of the spherical nature of the body 162. A cup 168 is interposed between the pressure plate 114 and the bushing 166, the cup 168 receiving such bushing. A spring-pin assembly 170 extends through the bore 164 and urges the bushing 166 and cup 168 into engagement with each other, and further urges the cup 168 against the pressure plate 114. The spring-pin assembly 170 comprises a pin 172 passing through the bore 164 and having a head 174 at one end thereof in engagement with the pressure plate 114, as shown. The opposite end of the pin 172 is characterized by a washer 176 maintained by a keeper ring 178. A spring 180 is received about the pin 172 and within the counter bore 182 and is compressively maintained between the washer 176 and a shoulder of the counter bore 182 to constantly urge the body 162, bushing 166, cup 168, and pressure plate 114 into contacting engagement with each other, as shown in FIG. 9.

It will be appreciated that the caliper arms 94, 96 pivot about respective trunions 104, 106 by the urging of the armatures 78, 80. Accordingly, as the clam shell of the armatures 78, 80 opens, the caliper arms 94, 96 pivot about the respective trunions 104, 106 such that the pressure plates 114, 116 are urged toward each other, driving the respective wear pads 72 toward each other and in frictional contacting engagement with each side of the disk 58. When the coil 86 is energized, the armatures 78, 80 are drawn toward each other, withdrawing the pressure plates 114, 116 from the respective friction pads 72, thus releasing the brake. A return spring 120, positioned between one end of the armature linkage 88 and the trunion 90, assures positive retraction of the caliper arms 94, 96 and, accordingly, the pressure plates 114, 116, to prevent drag of the wear pads 72 upon the disk 58.

Those skilled in the art will readily appreciate that with the coil 86 actuated, the armatures 78, 80 are drawn toward each other in a closed clam shell configuration, releasing the pressure plates 114, 116 from engagement with the brake pads 74. However, when the coil 86 is de-energized, the torque spring 84 urges the armatures 78, 80 away from each other. This motion, transferred through the trunions 90, 92, 104, 106, 110, 112 causes the caliper arms 94, 96 to urge the pressure plates 114, 116 toward each other, applying the brake as aforesaid.

The structure of the caliber disk brake 50 accommodates axial movement of the shaft keyed to the hub 60 of the brake disk 58. With the friction pads 72 received in the openings 74 of the side plates 66 and axially slidable therein, the pads adjust to accommodate axial movement of disk 58 without rubbing or dragging. Similarly with the caliper arms 94, 96 being pivotally connected at one of their ends as by trunions 90, 92 and free floating at the opposite end having the pressure plates 114, 116, the caliper arms and pressure plates also move to accommodate the stated axial movement of the disk 58 and attached shaft.

An armature gap indicator 122 is received within one or both of the armatures 78, 80. As illustrated in FIG. 4, the armature 80 receives a spring biased pin in a bore passing therethrough from one side to the other. With the spring biased pin normally being urged toward the armature 78, the extension of the pin from the bore on the exterior side of the armature 80 constitutes an indication as to the gap existent between the two armatures. This gap can either be noted visually by observing the extension of the pin, or it may be physically measured, if desired.

A release mechanism 124 is interconnected between top portions of the armatures 78, 80 to allow them to be pulled together against the urging of the torque spring 84 in the event that the replacement of the pads 72 is desired. It will be appreciated that with the clamshell closed through the pulling of the armatures together, the pressure plates 114, 116 are disengaged from the brake pads 72, allowing for a servicing procedure. The slide pin assembly 68 is then manipulated such that the pin 70 is retracted as between the side plates 66. With the pin 70 so retracted, the caliper arm plates 94, 96 and the interconnecting cross link member 108 may be pivoted upwardly as about the trunions 90, 92. With the cross link member 108 having cleared the projection path of the pin 70, the slide pin assembly 68 may then be manipulated to allow the pin 70 to project outwardly as shown in FIG. 2. At this point, the caliper arm plates 98, 100 and interconnecting cross link member 108 may be brought to rest upon the pin, with the pressure plates 114, 116 being away from the pads 72. With the pads 72 so exposed, they may be simply removed from their associated openings 74 and replaced with new pads as required. The pads 72 are extremely small and light in comparison to the shoes of the prior art, and accessing the pads is far simpler than the prior art. Accordingly, the total servicing technique is greatly simplified over that of the prior art. Additionally, and as will be presented further below, the wear pads 72 may be split or bifurcated to further simplify servicing and reduce the costs incident thereto.

Figure 8:
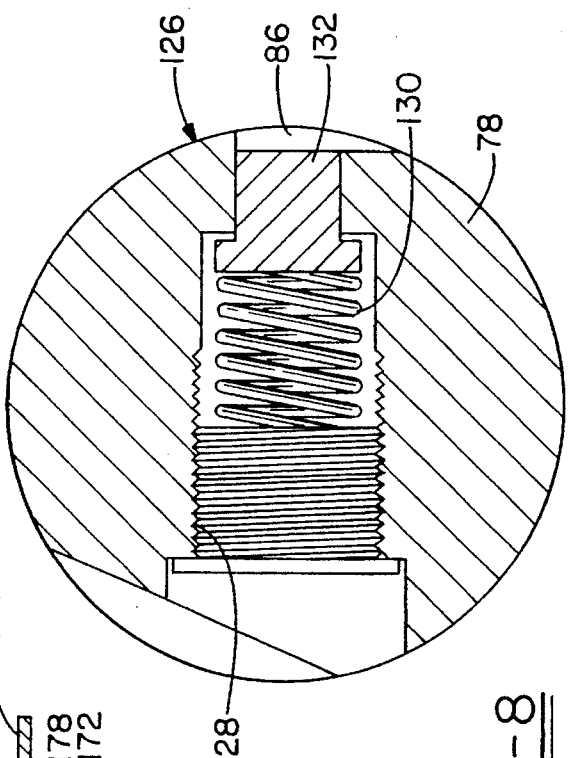
FIG. 8 is an exploded view of a center spring and button used in the invention to align the armatures with the electromagnetic coil.

As shown in FIG. 4, and in exploded view in FIG. 8, spring and button assemblies 126 are provided in each of the armatures 78, 80 to assure centering of the armatures with respect to the coil 86. Each of the spring and button assemblies 126 includes a threaded button 128 received within a threaded bore in the associated armature. A spring, 130 extends forwardly of the threaded button 128 and is interposed between such button and a piston 132 which is urged against the coil 86. It will be appreciated that the provision of such piston and button assemblies 126 in each of the armatures 78, 80 assures centering of the armatures with respect to the coil 86.

Means are also provided for adjustment of the armature gap, either manually or through a self adjuster. As shown in FIG. 4, manual adjustment may be attained by means of a hex or other tool-receiving configuration on one end of the threaded shaft of the armature linkage 88. With the shaft threaded into the trunion 92, turning of the shaft provides for the adjustment feature. The shaft is simply rotated until the armature gap indicator 122 is at some predetermined posture indicative of a proper gap setting, which posture is preferably flush with the armature housing 80. The movement of the trunion 92 upon the threaded shaft also provides a visual indication as by the wear indicator 138 of the remaining wear life of the pads 72.

It is also contemplated that a self adjusting mechanism 136 may alternatively be employed. Self adjuster 136 comprises a pawl and ratchet clutch in operative engagement with a spring biased wear adjuster plate 160 to measure excess armature gap opening and index the pawl and ratchet clutch. The self adjuster 136 incorporates a frictional torque limiter so that when the brake is worn out and the trunion 92 contacts the self adjuster 136, the self adjuster mechanism will not be damaged. That same frictional torque limiter may be used without the self adjuster 136 to restrict rotation of the threaded shaft during operation to prevent it from coming out of adjustment. Such allows the turning of the threaded rod 88 to overcome the frictional torque limiter until the gap indicator 122 is flush, as discussed above.

Figure 7:
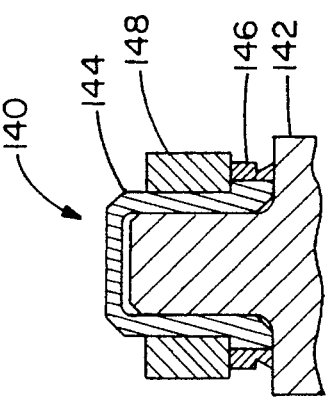
FIG. 7 is an exploded cross sectional view of a sealed and lubricated trunion bushing employed in the invention.

It is also contemplated as a portion of the invention that each of the trunions incorporates a trunion bushing 140 as shown in FIG. 7. Here, each end of the trunion typically includes a diameter or head 142 received within a respective bearing cup 144 which contains a lubricant. A V-ring seal 146 is interposed between bearing cup 144 and a shoulder of the trunion, the same being retained in place by means of the caliper arms 94, 96 received over the cup 144. It is contemplated that such a structure can provide for a sealed lubricated bushing which does not require service during the life of the brake 50.

Figure 6:
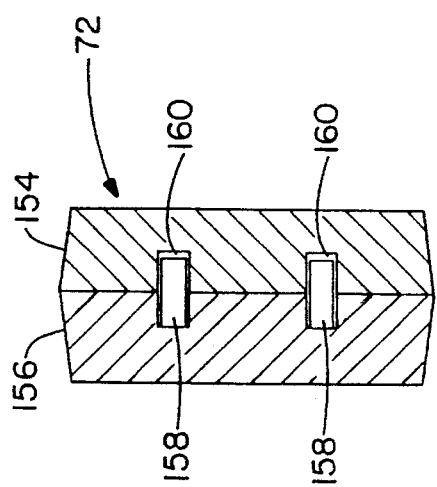
FIG. 6 is a cross sectional view of the caliper disk wear pad showing its split configuration.
Figure 5:
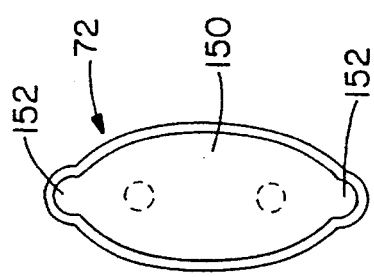
FIG. 5 is a top plan view of a caliper disk wear pad.

With reference now to FIGS. 5 and 6, the detailed structure of the friction pads 72 can be obtained. In the preferred embodiment of the invention, the friction pads 72 have a generally elliptical shaped body portion 150, with radiused end portions 152. In the preferred embodiment of the invention, the brake pads 72 are symmetrical about orthogonal axes, as is apparent from FIG. 5. They are also substantially uniform throughout the thickness of the pad 72. Accordingly, the brake pads 72 can be placed within the respective openings 74 of the side plates 66 in any orientation exposing a wear or friction surface to the disk 58. In other words, the brake pads 72 can not be improperly placed in the openings 74.

As shown in FIG. 6, it is preferred that each of the wear pads 72 be bifurcated or split in two portions 154, 156. The wear pad portions 154, 156 are held together in registration by means of roll pins or spring pins 158 received in partial depth bores 160 in each of the portions 154, 156. The bifurcated nature of the wear pads 72 allows for optimum use of the wear portions thereof, and allows for replacement of only the worn portion of the wear pads 72 at any point in time. The pins 158 hold the portions 154, 156 together without bonding, providing for ease of repair and rebuilding. Of course, it is also contemplated that the wear pads 72 may be devised as a single integral unit, if desired. In the preferred embodiment of the invention, the wear pads 72 are substantially homogeneous and of an organic material.

It will be noted that the radiused end portions 152 of each of the bifurcated halves 154, 156 is tapered or rounded from their outer surfaces to their surfaces of interconnection, as best shown in FIG. 6. This tapering or rounding of the radiused end portion 152 allows for self aligning of each pad 72 against the disk 58 even if the wear is not the same on each pad. For such purposes, primary engagement between the pads 72 and the inner surface of the openings 74 is at the radiused end portions 152, with there being substantial tolerance or clearance between the elliptical body portion 150 and the openings 74. This self aligning feature further reduces pad-disk drag and extends wear life. Such wear life is further enhanced by the free floating nature of the pressure plates 114, 116 and that same nature of the caliper arms 94, 96.

It will also be appreciated that substantially no torque is carried by the caliper arms 94, 96, but such torque is transferred from the pads 72 to the side plates 66 through the openings 74.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A caliper disk brake, comprising:

a magnet assembly;

a pair of caliper arms connected at first ends thereof to said magnet assembly;

a spring operatively connected to said caliper arms and urging a second end of each of said caliper arms toward each other;

a disk adapted for connection to a rotatable shaft;

means for maintaining at least one brake pad on each side of said disk in axially moveable relation to said shaft, said brake pads being positioned between and separate from said second ends of said caliper arms; and a free floating cross link member pivotally interconnecting said caliper arms between said first and second ends, said cross link member being received upon a support means, said receipt maintaining said second ends of said caliper arms in alignment with said brake pads.

2. The caliper disk brake according to claim 1, wherein said caliper arms are upwardly pivotal, removing said second ends of said caliper arms from said alignment with said brake pads, and exposing said brake pads.

3. The caliper disk brake according to claim 1, wherein said means for maintaining said brake pads comprises a pair of plates having openings therein, said openings slidingly receiving said brake pads.

4. The caliper disk brake according to claim 3, wherein each said brake pad has an elongated body portion and diametrically opposed radiused end portions.

5. The caliper disk brake according to claim 4, wherein each said radiused end portion is tapered from opposite outer surfaces to an intermediate area.

6. The caliper disk brake according to claim 5, wherein each said brake pad comprises a pair of brake pad halves joined together by pins at said intermediate area.

7. The caliper disk brake according to claim 6, wherein each said brake pad is symmetrical about a pair of orthogonal axes.

8. The caliper disk brake according to claim 1, further comprising a base, said base having a slot therein, said disk being received by said slot and said base extending beyond a vertical centerline of said disk.

9. The caliper disk brake according to claim 8, wherein said base has a plurality of mounting holes, said holes being spaced according to an AISE specification for a corresponding drum-shoe brake.

10. The caliper disk brake according to claim 1, further comprising a pressure plate mounted to said second end of each of said caliper arms by a self aligning trunion and bushing.

11. The caliper disk brake according to claim 10, wherein said self aligning trunion and bushing comprise a spring biased bushing urged into a mating cup, said mating cup being maintained adjacent said pressure plate.

12. The caliper disk brake according to claim 11, wherein said bushing is semi-spherical and received by said trunion.

13. A caliper disk brake according to claim 1, wherein said magnet assembly comprises a pair of armatures, and further comprising an armature gap indicator received within a bore of one of said armatures and passing therethrough, said armature gap indicating comprising a spring biased pin.

14. The caliper disk brake according to claim 1, wherein said magnet assembly comprises a pair of armatures, and further comprising an armature linkage extending between said armatures and having a trunion at each end thereof, said trunions receiving said caliper arms at said first ends.

15. The caliper disk brake according to claim 14, further comprising means at one end of said armature linkage for adjusting said linkage to establish a gap between said armatures when said coil is not energized.

16. The caliper disk brake according to claim 15, wherein said armature linkage comprises a threaded rod.

17. The caliper disk brake according to claim 1, further comprising pressure plates for operative engagement with said brake pads, and wherein said caliper arms are connected to said armatures and pressure plates by lubricated and sealed trunions.

18. The caliper disk brake according to claim 17, wherein each said plate has a plurality of apertures for receiving a plurality of brake pads therein.

19. The caliper disk brake according to claim 18, wherein each said plate has three apertures and maintains three brake pads therein.

20. The caliper disk brake according to claim 1, wherein said means for maintaining said brake pads comprises a pair of opposed plates, each slidingly receiving a brake pad in an opening therein, said pressure plates moving said brake pads in said openings axially with respect to said disk, said plates receiving braking torque resulting from engagement of said brake pads with said disk, said caliper arms receiving substantially no such braking torque.

21. A caliper disk brake, comprising:

a pair of armatures having an electromagnetic coil and a spring interposed therebetween, said spring urging said armatures apart, and actuation of said coil urging said armatures together, said coil being separate from each of said armatures, and each of said armatures being movable toward and away from the other;

a pair of caliper arms, one connected at a first end thereof to each of said armatures;

a disk adapted for connection to a rotatable shaft;

means for maintaining at least one brake pad on each side of said disk in axially movable relation to said shaft, said brake pads being position between second ends of said caliper arms; and a cross link member pivotally interconnecting said caliper arms between said first and second ends.

22. A caliper disk brake, comprising:

a magnet assembly;

a pair of caliper arms connected at first ends thereof to said magnet assembly;

a spring operatively connected to said caliper arms and urging a second end of said caliper arms toward each other;

a disk adapted for connection to a rotatable shaft;

a pair of stationary plates receiving said disk therebetween, said plates having apertures for maintaining at least one brake pad on each side of said disk in axially moveable relation to said shaft, said brake pads being positioned between said second ends of said caliper arms.

* * * * *